United States Patent [19]

Ingram et al.

[11] Patent Number: 4,732,243
[45] Date of Patent: Mar. 22, 1988

[54] AUTOMATIC ADJUSTER FOR A VEHICLE BRAKE ACTUATOR

[75] Inventors: Brian Ingram, Gloucestershire; Hugh G. Margetts, Herefordshire; John R. Rees, West Midlands, all of England

[73] Assignee: Lucas Industries, Public Limited Company, Birmingham, England

[21] Appl. No.: 928,638

[22] Filed: Nov. 6, 1986

Related U.S. Application Data

[63] Continuation of Ser. No. 620,810, Jun. 15, 1984, abandoned.

[30] Foreign Application Priority Data

Jun. 16, 1983 [GB] United Kingdom ............... 8316390

[51] Int. Cl.$^4$ ............................................. F16D 65/56
[52] U.S. Cl. .................... 188/196 D; 188/79.5 GT; 188/196 V
[58] Field of Search ............... 188/79.5 GT, 79.5 GE, 188/79.5 P, 79.5 SC, 196 D, 196 V, 196 P, 106 A, 71.9, 71.8, 199, 202, 205, 106 P

[56] References Cited

U.S. PATENT DOCUMENTS

| | | | |
|---|---|---|---|
| Re. 28,412 | 5/1975 | Farr | 188/79.5 GT |
| 2,026,401 | 12/1935 | Rockwell | 188/79.5 GT |
| 3,783,981 | 1/1974 | Burgdorf | 188/196 D |
| 3,809,189 | 5/1974 | Farr | 188/196 D |
| 3,811,539 | 5/1974 | Farr | 188/196 D |
| 3,920,103 | 11/1975 | Haraikawa | 188/196 D |
| 4,385,548 | 5/1983 | Persson et al. | 188/196 D |

Primary Examiner—John W. Caldwell, Sr.
Assistant Examiner—Alvin Oberley
Attorney, Agent, or Firm—Holman & Stern

[57] ABSTRACT

An automatic adjuster for a vehicle brake actuator has a non-rotatable brake shoe-engaging tappet, an adjuster member having a threaded shank threadedly engaged with a nut, the adjuster member co-acting with the tappet so that said rotation of the adjuster member causes axial movement of the tappet. The adjuster member is drivingly coupled by a coupling member to a shaft having an external reversible thread and a spring acting between the tappet and shaft urges the tappet against the shoe. A clutch ring has an internal reversible thread whereby it engages the corresponding thread on the shaft and is resiliently urged towards a fixed clutch face. The clutch ring controls rotation of the adjuster member during brake actuation and release to adjust the retracted position of the tappet to compensate for wear of the brake shoe. The force provided by the spring is relieved upon brake actuation, during which adjustment occurs, so that torque applied through the clutch ring is reduced with a consequent reduction in wear of the ring.

13 Claims, 4 Drawing Figures

AUTOMATIC ADJUSTER FOR A VEHICLE BRAKE ACTUATOR

This is a continuation of application Ser. No. 620,810, filed June 15, 1984, now abandoned.

BACKGROUND OF THE INVENTION

This invention relates to an automatic adjuster for use in a vehicle brake actuator and including a tappet for engagement, in use, with a brake shoe, an adjuster member forming a non-reversible threaded connection such that rotation of the member causes axial movement of the tappet, and adjusting mechanism for rotating the adjuster member to adjust the axial position of the tappet when required, said mechanism including a clutch ring carrying a reversible screw thread and co-operating with a corresponding reversible thread on the adjuster member or on means operatively associated with the latter. An adjuster of this general type is illustrated in FIG. 4 of our earlier British Pat. No. 1446552.

In shoe drum brakes arranged in a two leading shoe configuration, it is known to locate oppositely acting separate adjusters between the shoes in such a manner that for one direction of rotation, one of the adjusters adjusts one shoe and the other acts as an abutment for the other shoe, and vice-versa. Sometimes in an arrangement of this kind, a spring is placed between operative parts of the adjusters in order to cause the appropriate one of these parts to follow the leading shoe. Such a spring generates a force in the non-reversible thread which has to be overcome before adjustment can occur. As a result of this, torsional forces generated at the clutch ring can be unduly high, leading to rapid wear of the clutch faces. Moreover, when the adjuster is acting in the abutment mode, it has to sustain input force from the other leading shoe and a part of such force is transmitted through the clutch ring, further contributing to wear and possible distortion of the ring, and/or resulting in failure of the adjuster to operate with subsequent applications of the brake.

In addition to the above disadvantages, the force of the aforesaid spring provides too great a resistance to rotation of the adjuster components when manual de-adjustment of the device is required for servicing purposes.

SUMMARY OF THE INVENTION

An object of the present invention is to provide an automatic adjuster in which these problems are alleviated or avoided.

According to the present invention, an automatic adjuster for a vehicle brake actuator comprises a tappet for engagement, in use, with a brake shoe, an adjuster member forming a non-reversible threaded connection with means separate from the tappet, such that rotation of the adjuster member in one direction causes axial movement of the tappet, resilient means acting to separate the tappet and adjuster member, a clutch ring urged towards a normally non-rotatable clutch surface and operable to control rotation of said adjuster member by means of a reversible thread connection formed between the clutch ring and co-operating means, the arrangement being such that as the tappet moves in a shoe-applying direction, a predetermined clearance in the reversible thread is taken up and a force then generated at the reversible thread causes the clutch ring to be held against rotation by the clutch surface, whereby the reversible threads of said connection co-operate to cause rotation of the adjuster member in a direction such as to move the tappet outwardly thereof.

With such an arrangement, the force provided by the resilient means urging the tappet in a direction such as to follow the shoe is relieved as the shoe moves in the shoe-applying direction, and since adjustment occurs during this movement, the torque generated at the clutch ring, although sufficient for clutching purposes, is significantly reduced in comparison with the aforesaid prior art arrangement and wear in the clutch ring is correspondingly less.

Preferably, the adjuster components are arranged so that the clutch ring is permitted a degree of self-centering relative to the adjuster member and clutch surface. This enables the components to be manufactured to relatively large tolerances, which reduces the cost of manufacture, the more so because assembly is thereby facilitated.

In one convenient arrangement, an intermediate member has a reversible thread formed thereon engaged by the corresponding thread of the clutch ring which surrounds it, said intermediate member being coupled to the adjuster member by a connecting device which permits radial movement of the intermediate member relative to the adjuster member, thereby to provide said self-centering of the clutch ring. Alternatively, the clutch surface may be formed on a seat member movable radially relative to the adjuster member in order to permit said self-centering.

Advantageously, the arrangement is such that abutment loads sustained by the tappet are transferred to the adjuster member via one or more intermediate components, in such a manner as to by-pass the clutch ring. This arrangement contributes further towards minimising wear and distortion of the clutch ring, as compared with the aforesaid prior art arrangement.

BRIEF DESCRIPTION OF THE DRAWINGS

The invention will now be described, by way of example, with reference to the accompanying drawings in which.

DETAILED DESCRIPTION OF THE INVENTION

Figure 1:
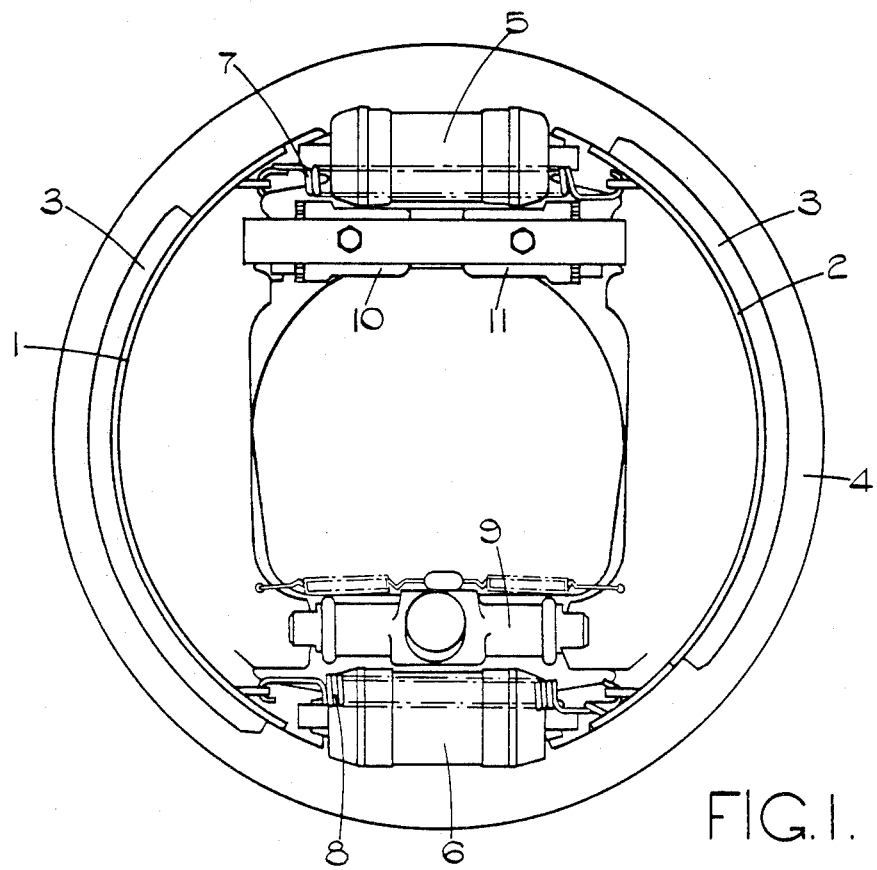
FIG. 1 is an end elevational view of a shoe-drum brake arranged in two leading shoe configuration and incorporating a pair of adjusters of the invention arranged in opposed relationship.

Referring to FIG. 1 of the drawings, the shoe drum brake illustrated therein includes a pair of brake shoes 1, 2, each carrying a lining of friction material 3 and being mounted on a stationary back plate 4. The brake is provided with a pair of hydraulic actuators 5, 6 located between respective pairs of shoe ends, each actuator having a pair of opposed pistons operable under the effect of hydraulic pressure to move the shoes outwardly into braking engagement with a surrounding brake drum (not shown) against the action of shoe return springs 7 and 8. The brake normally operates in a two leading shoe mode under the action of the actuators 5 and 6. Alternative mechanical actuation is provided in the form of a wedge actuator 9. The maximum shoe to drum clearance of each shoe is maintained by respective automatic adjusters 10, 11 arranged back to back.

Figure 2:
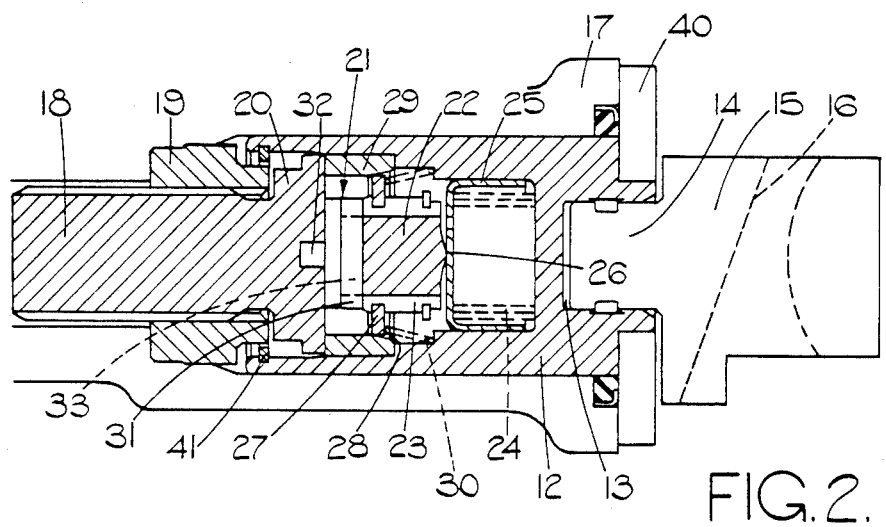
FIG. 2 is a cross-sectional view illustrating in more detail an adjuster of the invention suitable for use in the arrangement of FIG. 1.

One form of adjuster suitable for use in the brake of FIG. 1 is illustrated in FIG. 2. The adjuster includes a tappet 12 which is slotted at 13 to receive a boss 14 of a tappet head 15 having an inclined surface 16 against which a shoe would bear, in use. The tappet 12 is non-rotatable by virtue of its connection with the shoe via the tappet head 15 and is slidably mounted in a housing 17, which may either be a separate body attached to the back plate 4 or a body formed integrally with the latter. An adjuster member is provided in the form of a screw having an externally threaded shank 18 which is threadedly engaged, in non-reversible manner, with a nut member 19 fixed in the housing 17, or alternatively formed integrally therewith. An enlarged head 20 of the adjuster member is drivingly connected, by way of a coupling member 21, to a shaft 22, the outer surface of which is provided with a reversible screw thread 23. A coil compression spring 24 is housed within a cage 25 and bears at one end on an inner surface of the tappet 12 and at its other end, via the cage, on the adjacent end of the shaft 22, thereby acting to separate the tappet and adjuster member. The shaft is provided with a domed formation 26 providing point contact between the end of the shaft 22 and cage 25 in order to avoid rotation of the shaft causing unwanted torsion in the spring 24.

A clutch ring 27 surrounds the shaft 22 and has an internal reversible screw thread corresponding to and co-operating with that formed on the shaft. The outer surface of the clutch ring is slightly bevelled and co-operates with a conical clutch seat 28 formed within a sleeve 29 which is a press fit within the tappet 12. The clutch ring is urged towards the seat 28 by a spring 30.

The coupling 21 comprises a boss 31 from one side of which projects a tongue 32 of rectangular section, engaging a corresponding groove formed in the adjacent end of the head 20. The other side of the boss 31 is provided with a groove extending at right angles to the tongue 32 and receiving therein a complementary tongue 33 formed on the adjacent end of the shaft 22. This form of driving connection between the adjuster member and shaft, generally known as an Oldham coupling, permits a degree of self-centering of the clutch ring 27 relative to the shaft.

The adjuster performs its adjusting operation during outward movement of the adjacent shoe towards the drum. During such outward movement of the shoe, the tappet 12 is caused by the spring 24 to move to the right, as seen in the drawing, in order to follow the shoe, taking with it the sleeve 29 and thereby moving the clutch ring 27 relative to the shaft 22. By providing an appropriate degree of backlash in the reversible screw thread 23, the tappet is permitted to move through a distance corresponding to the maximum required shoe to drum clearance without operation of the adjuster. When the shoe is required to move through a greater distance, because of wear in the shoe lining 3, the backlash in the reversible thread having been taken up, opposed flanks of the reversible threads respectively on the clutch ring and shaft 22 will now be forced into firm engagement and the clutch ring will consequently be locked against the clutch seat 28 and thereby prevented from rotating. Continued axial movement of the clutch ring with the tappet 12 will thereby cause the shaft 22 to rotate and with it, via the coupling 21, the adjuster member 18, in such a direction as to move the tappet outwardly of the adjuster member so as to set a new adjusted position for the shoe, upon retraction. The amount of adjustment will be only a small increment of that actually required and further adjustment will take place during subsequent brake applications.

The adjuster is prepared for further adjusting movement during retraction of the shoe under the action of the shoe return springs. As the tappet 12 moves to the left, as seen in the drawing, the clutch ring is caused to follow the tappet, under the action of the spring 30 and the intial part of its movement will take up the backlash in the opposite direction between the reversible screw threads. Once this has occurred, further axial movement of the shaft 22 in the retraction direction will have the effect of relieving the force in the spring 30, thereby enabling the clutch ring to rotate, under the action of the reversible thread, to a new position from which it will effect further rotation of the adjuster member 18 during the next brake application.

It will be seen that, since the spring 24 acts between the tappet 12 and shaft 22, the force which it applies through the non-reversible thread of the adjuster member 18 is reduced during brake application, that is to say when the minimum possible resistance is required in the non-reversible thread to facilitate adjustment. This means that the torque which has to be reacted by the clutch ring is significantly reduced, compared with some conventional arrangements, leading to a reduction in wear of the clutch ring and consequent longer life. Moreover, when the adjuster is required to act in the abutment mode, in which an input force is applied from the shoe to the tappet 12, this force is transmitted from the tappet via the sleeve 29 directly onto the head 20 of the adjuster member via the annular end surface of the sleeve 29, such force thereby by-passing the clutch ring and again avoiding heavy wear and possible distortion of the clutch ring to which some conventional adjusters of this type have hitherto been susceptible.

It is sometimes necessary, for example, prior to dismantling a brake, to wind the adjuster back manually to retract the shoes. This may be effected by manually rotating a "star" wheel 40 keyed to the outer end of the tappet 12. The force of the shoe return springs applied through the tappet forces the end of the sleeve 29 hard against the adjuster member head 20 and the frictional force so generated enables rotation of the sleeve 12 to be transmitted to the adjuster member.

It will be noted that the use of a separate sleeve 29 for providing the clutch surface 28 enables a convenient sub-assembly to be formed to facilitate assembly and fitting of the adjuster. It is thus possible to assemble into the tappet 12 the spring 24 and cage 25, together with the shaft 22, clutch ring 27, and spring 30, these being then trapped in place by pressing the sleeve 29 into position. It is then a simple matter to add the coupling 21 and adjuster member and subsequently a retaining circlip 41. This entire assembly may be fitted into the body 17 by engaging the shank 18 with the unit 19 already fixed in the body, the assembly being screwed to a desired position manually using the star wheel 40.

Figure 3:
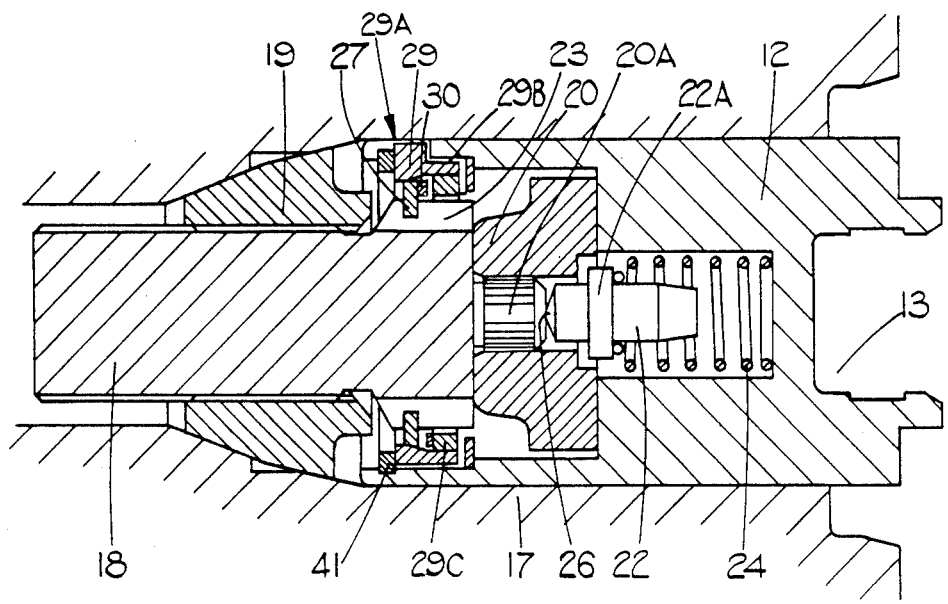
FIG. 3 is a view similar to FIG. 2 of an alternative form of the adjuster of the invention.

An alternative embodiment of the adjuster is illustrated in FIG. 3. The general arrangement of this adjuster is similar to that of FIG. 2 in that it includes a non-rotatable tappet 12 having a slot 13 to receive a tappet head (not shown), the tappet being slidable within the adjuster housing 17. An adjuster member has a threaded shank 18 which forms a non-reversible screw thread connection with a nut member 19 pressed into the housing 17 so as to be non-rotatable. The adjuster member has an enlarged head 20 secured to the adjuster member by engagement with a knurled spigot 20A fast with and projecting from the inner end of the shank 18. The spring 24, in this embodiment, acts between the tappet and a retainer in the form of a small shaft 22 which abuts the end of the spigot 20A by way of domed portion 26, the spring engaging a radial flange 22A of the shaft 22 and acting, as before, to separate the tappet and adjuster member, with domed portion 26 providing point contact to avoid torsional wind-up of the spring.

The adjuster member has formed on its inner end portion a reversible screw thread 23 for co-operation with a corresponding thread in the clutch ring 27. In order to provide a degree of self-centering for the clutch ring, the co-operating clutch seat therefor is formed on a seat member 29 which is supported within the tappet 12 with the possibility of limited radial play. This is achieved by forming a tongue in groove connection 29A between the two which permits said radial play whilst at the same time preventing rotation of the seat member relative to the tappet. As shown in the drawing, a tongue 29B is shown engaged in a groove of the tappet, but the reverse arrangement is also possible. The clutch ring is loaded against the seat 29 by a spring 30 which acts between an insert 29C, fast with the seat member 29, and the clutch ring 27. The sub-assembly formed by the components 27, 29, 29C and 30 is retained within the open end portion of the tappet 12 by a circlip 41.

With this embodiment, adjustment takes place in exactly the same manner as for the FIG. 2 arrangement, with the clutch ring controlling rotation of the adjuster member by way of the reversible thread connection. When the adjuster acts in the abutment mode, the abutment forces arising on the tappet pass from the latter to the enlarged head 20 and thence through the shank 18 and nut member 19 to the housing, again by-passing the clutch ring. Manual adjustment is effected by a "star" wheel (not shown) keyed to the tappet, as in the previous embodiment.

Figure 4:
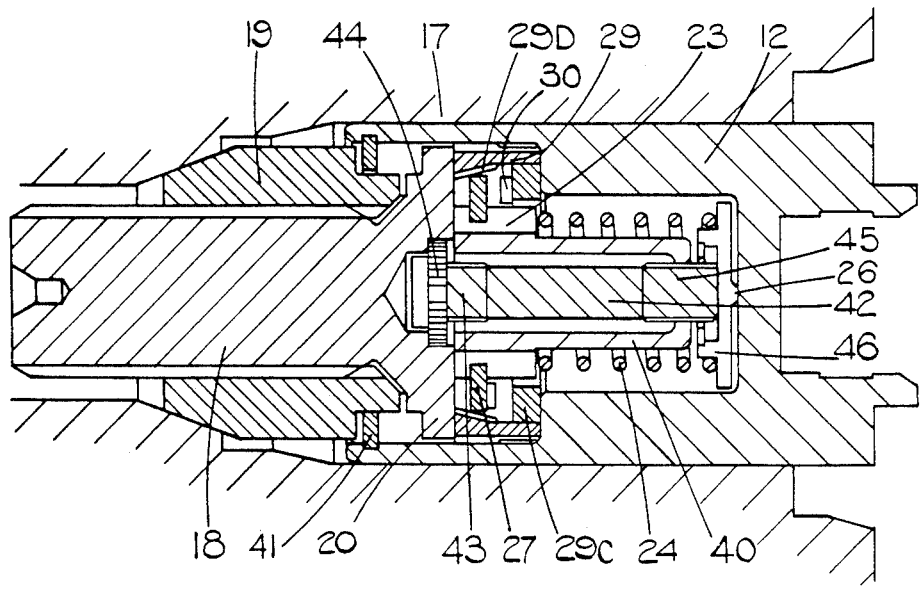
FIG. 4 is a view similar to FIGS. 2 and 3 of a further alternative form of the adjuster of the invention.

The further alternative embodiment shown in FIG. 4 again has a tappet 12 slidable in the housing 17, and an externally threaded adjuster member 18 forming a non-reversible screw thread connection with a non-rotatable nut member 19 pressed into the housing. The clutch ring 27, which again has an internal reversible thread, is threadedly engaged with a corresponding external thread 23 on a sleeve 40, one end of which is engaged with a splined end portion 45 of an intermediate drive shaft 42 which also has a splined portion 43 at its other end drivingly engaged with a knurled insert 44 fast for rotation with the adjuster shaft 18. The sleeve 40 is loaded by a spring 24 into engagement with an enlarged head 20 of the adjuster member 18, the spring also engaging a seat 46 through which it applies a force to the tappet 12 via a domed portion 26 of the seat such as to urge the latter to follow outward movement of the brake shoe engaged therewith. The spring thus acts to separate the tappet and adjuster member.

The splines 43, 45 are such as to permit a small measure of radial movement between the sleeve 40 and adjuster member 18 to compensate for small axial misalignment between these components, this in turn permitting the clutch ring to be self-centering relative to both these components, with the advantageous results referred to above. The clutch surface for co-operation with the clutch ring is once again formed on an annular internally coned seat member 29 which, in this embodiment is fixed within the tappet by press fitting or other suitable means. The clutch ring is urged against the clutch surface by a spring 30 acting between the ring and an insert 29C fast with the seat member 29. Adjustment takes place upon brake application as described previously with the clutch ring controlling rotation of the adjuster member 18 via the sleeve 40 and shaft 42.

In this embodiment, the clutch surface on the insert 29C is provided with serrations 29D which enable predetermined friction levels to be maintained between the clutch ring and clutch surface even when used in a grease environment. This feature can be applied to any embodiment of the invention, as desired, and could be reversed with the serrations on the clutch ring.

Although the adjuster of the invention is shown operating independently of the actuator, it may be incorporated within a mechanical or hydraulic actuator, if desired. When incorporated in a hydraulic actuator, lubrication of the adjuster parts is effected by the hydraulic fluid. When no hydraulic fluid is present, as in the arrangement illustrated, or in a mechanical actuator, the adjuster may operate in a grease environment. Although described in relation to a shoe drum brake actuator, the adjuster may also be incorporated in a disc brake actuator.

The invention will be understood to embrace a drum or disc brake actuator incorporating the adjuster.

What is claimed is:

1. An automatic adjuster for a vehicle brake actuator comprising a housing, a tappet movable in the housing and disposed for engagement, in use, with a braking element, an adjuster member having a non-reversible threaded connection with a means separate from the tappet rotationally and axially fixed relative to the housing, so that rotation of the adjuster member in one direction causes axial adjusting movement thereof, the adjuster member acting as a backstop to set the inwardly retracted position of the tappet, resilient means acting to separate the tappet and adjuster member, a clutch ring urged towards a normally non-rotatable clutch surface and operable to control rotation of said adjuster member by means of a reversible threaded connection having a predetermined clearance formed between the clutch ring and co-operating means, said clutch ring having limited radial movement with respect to said clutch surface and adjuster member to provide self-centering of said clutch ring, and an intermediate member separate from said adjuster member and having limited radial movement with respect to said adjuster member and clutch surface to facilitate said self-centering of said clutch ring, the resilient means acting between the tappet and the intermediate member so as to transmit force thereby to the adjuster member, the arrangement being such that as the tappet moves in a shoe-applying direction, the predetermined clearance in the reversible thread is taken up and a force then generated at the reversible thread causes the clutch ring to be held against rotation by the clutch surface, whereby the reversible threads of said connection co-operate to cause rotation of the adjuster member in said one direction to move said adjuster means axially to a new position relative to said fixed means and therby set an outwardly adjusted retracted position of the tappet.

2. An adjuster as claimed in claim 1 and further comprising means to transfer abutment loads sustained by said tappet to said adjuster member in a manner to bypass said clutch ring.

3. An adjuster as claimed in claim 1 wherein said clutch surface is formed on a seat member non-rotatably connected to said tappet, but movable radially relative to said tappet and the adjuster member to facilitate said self-centering of said clutch ring, the clutch ring co-operating with a reversible thread formed on the adjuster member.

4. An adjuster according to claim 3 wherein said resilient means is contained within a cage which makes substantially point contact with said intermediate member.

5. An adjuster as claimed in claim 3 wherein said clutch ring is loaded against said clutch ring and seat member, said clutch ring, resilient means and seat member forming a sub-assembly which is retained within an inner end portion of said tappet.

6. An adjuster as claimed in claim 1 wherein said clutch surface is provided with serrations.

7. A vehicle brake actuator incorporating an automatic adjuster as claimed in claim 1.

8. An adjuster as claimed in claim 1 wherein said clutch ring has serrations thereon engageable with said clutch surface.

9. An automatic adjuster for a vehicle brake actuator comprising a tappet for engagement, in use, with a brake shoe, an adjuster member including a non-reversible threaded connection with a means separate from the tappet, such that rotation of the adjuster member in one direction causes axial movement of the tappet, resilient means acting to separate the tappet and the adjuster member, a clutch ring urged towards a normally non-rotatable clutch surface and operable to control rotation of the adjuster member by means of a reversible thread connection formed between the clutch ring and co-operating means, said reversible thread connection having a predetermined clearance, the arrangement being such that as the tappet moves in a shoe-applying direction, the predetermined clearance in the reversible thread is taken up and a force then generated at the reversible thread causes the clutch ring to be held against rotation by the clutch surface so that reversible threads of said reversible thread connection co-operate to cause rotation of the adjuster member in a direction to move the tappet outwardly thereof; and an intermediate member engaged with the adjuster member, the resilient means acting between the tappet and said intermediate member to transmit force thereby to the adjuster member; the non-reversible threaded connection being disposed between the adjuster member and the means separate from the tappet; the adjuster being arranged so that the clutch ring is permitted a degree of self-centering relative to the adjuster member and clutch surface; said intermediate member having a reversible thread formed thereon engaged by a corresponding thread of the clutch ring which surrounds it forming said reversible thread connection, said intermediate member being coupled to the adjuster member by a connecting device which permits radial movement of said intermediate member relative to the adjuster member, thereby facilitating said self-centering of the clutch ring.

10. An adjuster according to claim 9 wherein said connecting device forms tongue and groove connections respectively with a further member and the adjuster members, said connections permitting relative movement between said members in two mutually perpendicular radial directions.

11. An automatic adjuster for a vehicle brake actuator comprising a tappet for engagement, in use, with a brake shoe, an adjuster member including a non-reversible threaded connection with means separate from the tappet, such that rotation of the adjuster member in one direction causes axial movement of the tappet, resilient means acting to separate the tappet and adjuster member, a clutch ring urged towards a normally non-rotatable clutch surface and operable to control rotation of said adjuster member by means of a reversible thread connection formed between the clutch ring and co-operating means, the arrangement being such that as the tappet moves in a shoe-applying direction, a predetermined clearance in the reversible thread is taken up and a force then generated at the reversible thread causes the clutch ring to be held against rotation by the clutch surface, whereby the reversible threads of said reversible thread connection co-operate to cause rotation of the adjuster member in a direction such as to move the tappet outwardly thereof; and an intermediate member having a reversible thread formed thereon engaged by the corresponding thread of the clutch ring which surrounds it, said intermediate member being coupled to the adjuster member by a connecting device which permits radial movement of the intermediate member relative to the adjuster member, thereby to provide self-centering of the clutch ring; said intermediate member being in the form of a sleeve surrounding a shaft which forms a splined connection with the sleeve and adjuster member such as to permit relative radial movement between the sleeve and adjuster member in order to permit said self-centering of the clutch ring.

12. An adjuster according to claim 11 wherein the resilient means acts between the sleeve and a thrust element which makes substantially point contact with the tappet.

13. An automatic adjuster for a vehicle brake actuator comprising a tappet for engagement, in use, with a brake shoe, an adjuster member including a non-reversible threaded connection with a means separate from the tappet, such that rotation of the adjuster member in one direction causes axial movement of the tappet, resilient means acting to separate the tappet and the adjuster member, a clutch ring urged towards a normally non-rotatable clutch surface and operable to control rotation of the adjuster member by means of a reversible thread connection formed between the clutch ring and co-operating means, said reversible thread connection having a predetermined clearance, the arrangement being such that as the tappet moves in a shoe-applying direction, the predetermined clearance in the reversible thread is taken up and a force then generated at the reversible thread causes the clutch ring to be held against rotation by the clutch surface so that reversible threads of said reversible thread connection co-operate to cause rotation of the adjuster member in a direction to move the tappet outwardly thereof; and an intermediate member engaged with the adjuster member, the resilient means acting between the tappet and said intermediate member to transmit force thereby to the adjuster member; the non-reversible threaded connection being disposed between the adjuster member and the means separate from the tappet and said means separate from the tappet being rotationally and axially fixed with respect to the housing; the adjuster being ararnged so that the clutch ring is permitted a degree of self-centering relative to the adjuster member and clutch surface; said intermediate member having a reversible thread formed thereon engaged by a corresponding thread of the clutch ring which surrounds it forming said reversible thread connection, said intermediate member being in the form of a sleeve surrounding a shaft, said shaft having a splined connection with said sleeve and adjuster member for coupling said intermediate member to the adjuster member and permitting radial movement of said intermediate member relative to the adjuster member, thereby facilitating said self-centering of the clutch ring.

* * * * *